United States Patent
Liu et al.

(10) Patent No.: US 12,132,170 B2
(45) Date of Patent: Oct. 29, 2024

(54) ELECTROLYTE AND ELECTROCHEMICAL DEVICE

(71) Applicant: NINGDE AMPEREX TECHNOLOGY LIMITED, Fujian (CN)

(72) Inventors: Junfei Liu, Ningde (CN); Shuirong Zhang, Ningde (CN); Juan Ma, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 1112 days.

(21) Appl. No.: 16/970,295

(22) PCT Filed: Jan. 20, 2020

(86) PCT No.: PCT/CN2020/073177
§ 371 (c)(1),
(2) Date: Aug. 14, 2020

(87) PCT Pub. No.: WO2020/151649
PCT Pub. Date: Jul. 30, 2020

(65) Prior Publication Data
US 2021/0083327 A1    Mar. 18, 2021

(30) Foreign Application Priority Data
Jan. 25, 2019   (CN) .......................... 201910071217.4

(51) Int. Cl.
*H01M 10/05*    (2010.01)
*H01M 10/0525*    (2010.01)
*H01M 10/0567*    (2010.01)

(52) U.S. Cl.
CPC ... *H01M 10/0567* (2013.01); *H01M 10/0525* (2013.01); *H01M 2300/004* (2013.01)

(58) Field of Classification Search
None
See application file for complete search history.

(56) References Cited

U.S. PATENT DOCUMENTS

| | | | |
|---|---|---|---|
| 2012/0288771 A1 | 11/2012 | Lim et al. | |
| 2014/0023941 A1 | 1/2014 | Amine et al. | |
| 2014/0072865 A1* | 3/2014 | Suh | H01M 10/0567 429/188 |
| 2015/0171475 A1* | 6/2015 | Kondo | H01M 10/0568 429/188 |
| 2015/0180087 A1* | 6/2015 | Kim | H01M 10/0567 429/200 |
| 2016/0156066 A1* | 6/2016 | Gleason | H01M 10/0525 429/317 |
| 2016/0372789 A1* | 12/2016 | Cheng | H01M 10/05 |
| 2018/0026304 A1* | 1/2018 | Yokomizo | H01M 10/0525 429/188 |

FOREIGN PATENT DOCUMENTS

| | | | |
|---|---|---|---|
| CN | 1840550 A | 10/2006 | |
| CN | 101867065 | * 10/2010 | ........ H01M 10/0525 |
| CN | 101894974 A | 11/2010 | |
| CN | 103000945 A | 3/2013 | |
| CN | 103165939 A | 6/2013 | |
| CN | 103682416 A | 3/2014 | |
| CN | 103825047 A | 5/2014 | |
| CN | 104868163 A | 8/2015 | |
| CN | 105355968 A | 2/2016 | |
| CN | 105428714 A | 3/2016 | |
| CN | 105826604 A | 8/2016 | |
| CN | 107293781 A | 10/2017 | |
| CN | 107919498 A | 4/2018 | |
| CN | 108112276 A | 6/2018 | |
| CN | 108232300 A | 6/2018 | |
| CN | 108242556 A | 7/2018 | |
| CN | 108242567 A | 7/2018 | |
| CN | 108550913 A | 9/2018 | |
| CN | 109119688 A | 1/2019 | |
| CN | 109802180 A | 5/2019 | |

OTHER PUBLICATIONS

PCT International Search Report mailed Apr. 20, 2020 in counterpart PCT application PCT/CN2020/073177, 9 pages.
PCT Written Opinion mailed Apr. 20, 220 in counterpart PCT application PCT/CN2020/073177, 5 pages.
Chinese First Office Action mailed Apr. 21, 2020 in counterpart Chinese application 201910071217,4, 12 pages.
Chinese Second Office Action mailed Nov. 3, 2020 in counterpart Chinese application 201910071217,4, 12 pages.

* cited by examiner

*Primary Examiner* — Maria Laios
*Assistant Examiner* — Angela J Martin
(74) *Attorney, Agent, or Firm* — XSENSUS LLP

(57) ABSTRACT

The present application relates to an electrolyte and an electrochemical device including the same. The electrolyte includes a diboronic acid compound and a nitrile compound, so that the storage performance and cycle performance of the electrochemical device using the electrolyte can be remarkably improved.

12 Claims, No Drawings

ELECTROLYTE AND ELECTROCHEMICAL DEVICE

CROSS REFERENCE TO THE RELATED APPLICATIONS

The present application is a National Stage application of PCT international application: PCT/CN2020/073177, filed on 20 Jan. 2020, which claims the benefit of priority from China Patent Application No. 201910071217.4, filed on 25 Jan. 2019, the disclosure of which is hereby incorporated by reference in its entirety.

1. TECHNICAL FIELD

The present application relates to the technical field of electrochemical devices, and more particularly to an electrolyte and an electrochemical device including the same.

2. DESCRIPTION OF THE RELATED ART

Electrochemical devices (for example, lithium-ion batteries) have become an indispensable component for modern electronic products. Soft pack batteries is have become mainstream products in consumer electronic products, and the use of soft pack batteries is increasing. The main advantage of soft pack batteries is the increase in volumetric energy density and mass energy density, but the problem of battery swelling is also a primary concern to be solved for soft pack batteries. At the same time, safety issues are also an urgent problem to be solved.

SUMMARY

The present application provides an electrolyte and an electrochemical device including the same in an attempt to solve at least one of the problems found in the related art at least to some extent.

According to some embodiments, the present application provides an electrolyte including a diboronic acid compound and a nitrile compound, which can improve high-temperature storage performance, cycle performance, safety performance (e.g., hotbox test) and the like, of an electrochemical device.

According to embodiments of the present application, the present application provides an electrolyte, including a diboronic acid compound and a nitrile compound.

According to embodiments of the present application, the diboronic acid compound in the electrolyte includes a compound of Formula (I), a compound of Formula (II) or any combination thereof:

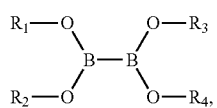

Formula (I)

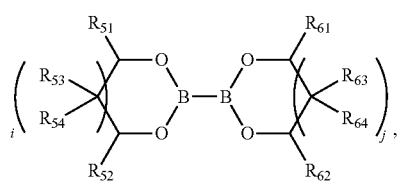

Formula (II)

wherein $R_1$, $R_2$, $R_3$ and $R_4$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is is halogen. $R_{51}$, $R_{52}$, $R_{53}$, $R_{54}$, $R_{61}$, $R_{62}$, $R_{63}$ and $R_{64}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen. $R_{53}$ and $R_{54}$ are connectable to form a ring, and $R_{63}$ and $R_{64}$ are connectable to form a ring. Also, i and j are 0 or 1.

According to embodiments of the present application, the compound of Formula (I) or Formula (II) is at least one selected from the following compounds:

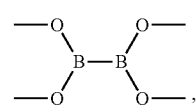

Formula (I-1)

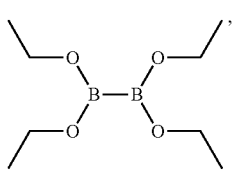

Formula (I-2)

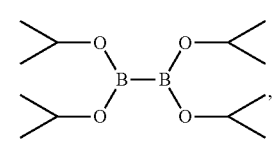

Formula (I-3)

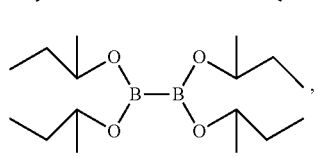

Formula (I-4)

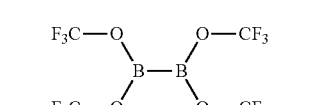

Formula (I-5)

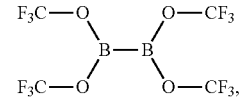

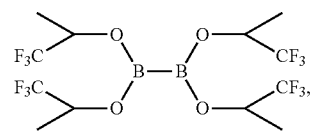

Formula (I-6)

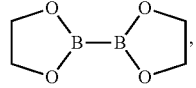

Formula (II-1)

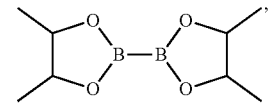

Formula (II-2)

Formula (II-3)

Formula (II-4)

Formula (II-5)

Formula (II-6)

Formula (II-7)

Formula (II-8)

Formula (II-9)

Formula (II-10)

Formula (II-11)

Formula (II-12)

Formula (II-13)

Formula (II-14)

Formula (II-15)

According to embodiments of the present application, the nitrile compound in the electrolyte includes a compound of Formula (III), a compound of Formula (IV), a compound of Formula (V) or any combination thereof:

Formula (III)

Formula (IV)

Formula (V)

wherein $R_7$, $R_8$, $R_9$, $R_{10}$ and $R_{11}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the is substituent is halogen. Also, a, b, c, d, m, n and p are each independently an integer of 0-10.

According to embodiments of the present application, the compound of Formula (III) is at least one selected from the group consisting of succinonitrile, glutaronitrile, adiponitrile, pimelonitrile, suberonitrile, 2-methylene glutaronitrile and dipropyl malononitrile.

According to embodiments of the present application, the compound of Formula (IV) or Formula (V) is at least one selected from the following compounds:

Formula (IV-1)

Formula (IV-2)

Formula (IV-3)

Formula (V-1)

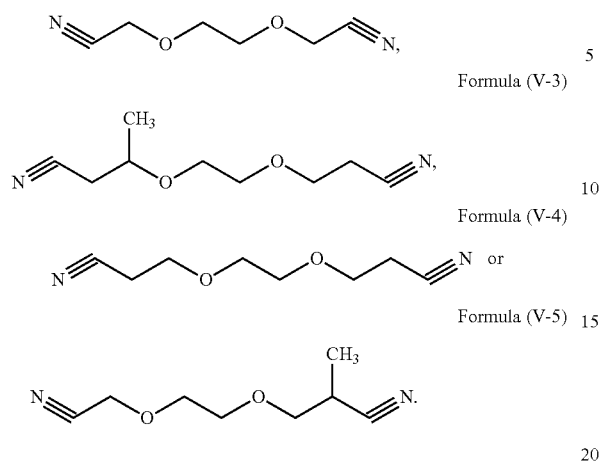

Formula (V-2)
Formula (V-3)
Formula (V-4)
Formula (V-5)

According to embodiments of the present application, the weight percentage of the diboronic acid compound in the electrolyte is about 0.01 wt %-about 5 wt %, and the weight percentage of the nitrile compound in the is electrolyte is about 0.01 wt %-about 15 wt %.

According to embodiments of the present application, the electrolyte further includes a phosphate compound, a phosphite compound or any combination thereof, the phosphate compound including a compound of Formula (VI), the phosphite compound including a compound of Formula (VII):

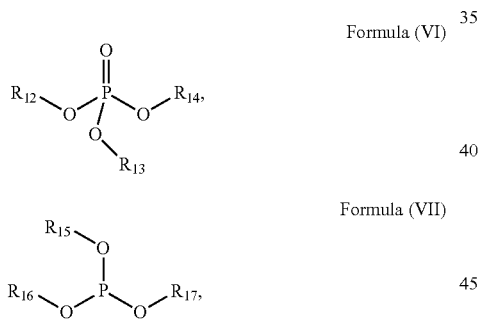

Formula (VI)
Formula (VII)

wherein $R_{12}$, $R_{13}$ and $R_{14}$ are each independently selected from a substituted or unsubstituted $C_1$-$C_{12}$ alkyl group, a substituted or unsubstituted $C_1$-$C_{12}$ silyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen. $R_{15}$, $R_{16}$ and $R_{17}$ are each independently selected from a substituted or unsubstituted $C_1$-$C_{12}$ linear-chain or branched-chain alkyl group, a substituted or unsubstituted $C_2$-$C_{12}$ linear-chain or branched-chain alkenyl group, a substituted or unsubstituted $C_2$-$C_{12}$ linear-chain or branched-chain alkynyl group, and a substituted or unsubstituted $C_3$-$C_{12}$ cycloalkyl group, wherein when substituted, the substituent is halogen.

According to embodiments of the present application, the compound of is Formula (VI) or the compound of Formula (VII) is at least one selected from the following compounds:

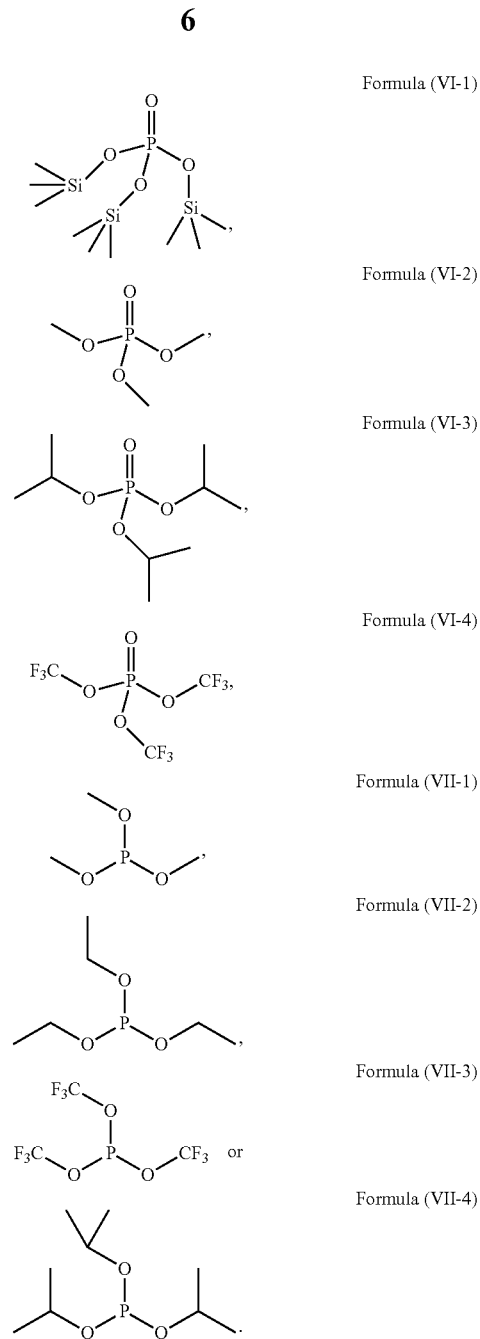

Formula (VI-1)
Formula (VI-2)
Formula (VI-3)
Formula (VI-4)
Formula (VII-1)
Formula (VII-2)
Formula (VII-3)
Formula (VII-4)

According to embodiments of the present application, the electrolyte further includes an epoxy silane, the epoxy silane including a compound of Formula (VIII):

Formula (VIII)

wherein $R_{18}$ and $R_{19}$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, and a substituted or unsubstituted $C_1$-$C_{12}$ cycloalkyl group, and when substituted, the substituent is halogen. $2 \le x \le 5$, and x is an integer.

According to embodiments of the present application, the compound of Formula (VIII) is at least one selected from the following compounds:

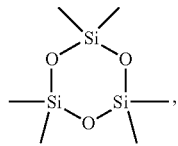

Formula (VIII-1)

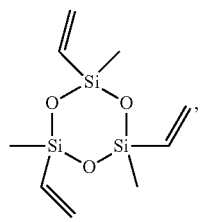

Formula (VIII-2)

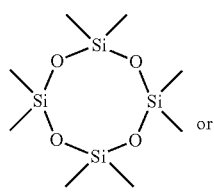

Formula (VIII-3)

or

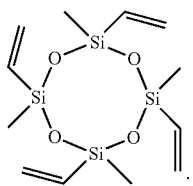

Formula (VIII-4)

According to embodiments of the present application, the electrolyte further includes one or more of vinylene carbonate, fluoroethylene carbonate, 1,3-propane sultone, vinyl sulfate, lithium difluorophosphate, tris(trimethylsilyl) phosphate or trivinyl trimethylcyclotrisiloxane.

According to embodiments of the present application, the present application further provides an electrochemical device, including a cathode containing a cathode active material, an anode containing an anode active material, a separator, and any of the above electrolytes.

The additional aspects and advantages of the embodiments of the present application will be described and illustrated in part in the description which follows, or explained by the implementation of the embodiments of the present application.

DETAILED DESCRIPTION

The embodiments of the present application will be described in detail below. The embodiments of the present application should not be construed as limiting the present application.

As used herein, the terms "comprise", "contain" and "include" are used in their open and non-limiting sense.

As used herein, the terms "approximately", "generally", "substantially" and "about" are used to describe and explain minor changes. When used in conjunction with an event or situation, the terms may refer to examples where the event or situation occurs exactly and examples where the event or situation occurs very closely. For example, when used in conjunction with a numerical value, the terms may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two values is less than or equal to ±10% of the average value of the values (e.g., less than or equal to ±5%, less than or equal to ±4%, less than or equal to ±3%, less than or equal to ±2%, less than or equal to ±1%, less than or equal to ±0.5%, less than or equal is to ±0.1%, or less than or equal to ±0.05%), the two values may be considered "generally" the same.

In specific embodiments and claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In specific embodiments and claims of the present application, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, "hydrocarbyl group" covers alkyl, alkenyl and alkynyl groups. For example, a hydrocarbyl group is intended to be a linear-chain hydrocarbon structure having 1 to 20 carbon atoms. "Hydrocarbyl group" is also expected to be a branched-chain or cyclic hydrocarbon structure having 3 to 20 carbon atoms. When a hydrocarbyl group having a specific carbon number is specified, it is intended to cover all geometric isomers having that carbon number. The hydrocarbyl group herein may also be a hydrocarbyl group having 1-15 carbon atoms, a hydrocarbyl group having 1-10 carbon atoms, a hydrocarbyl having 1-5 carbon atoms, a hydrocarbyl group having 5-20 carbon is atoms, a hydrocarbyl group having 5-15 carbon atoms or a hydrocarbyl group having 5-10 carbon atoms. Additionally, the hydrocarbyl group can be optionally substituted. For example, the hydrocarbyl group may be substituted by halogen including fluorine, chlorine, bromine and iodine, an alkyl group, an aryl group or a heteroaryl group.

As used herein, "alkyl group" is intended to be a linear-chain saturated hydrocarbon structure having 1 to 20 carbon atoms. "Alkyl group" is also expected to be a branched-chain or cyclic hydrocarbon structure having 3 to 20 carbon atoms. For example, the alkyl group may be an alkyl group having 1-20 carbon atoms, an alkyl group having 1-10 carbon atoms, an alkyl group having 1-5 carbon atoms, an alkyl group having 5-20 carbon atoms, an alkyl group having 5-15 carbon atoms or an alkyl group having 5-10 carbon atoms. When an alkyl group having a specific carbon number is specified, it is intended to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl.

Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like. Additionally, the alkyl group can be optionally substituted.

As used herein, the term "alkylidene group" means a linear-chain or branched-chain divalent saturated hydrocarbyl. For example, the alkylidene group may be an alkylidene group having 1-20 carbon atoms, an alkylidene group having 1-15 carbon atoms, an alkylidene group having 1-10 carbon atoms, an alkylidene group having 1-5 carbon atoms, an alkylidene group having 5-20 carbon atoms, an alkylidene group having 5-15 carbon atoms or an alkylidene group having 5-10 carbon atoms. Representative alkylidene includes, for example, methylene, ethane-1,2-diyl("ethylidene"), propane-1,2-diyl, propane-1,3-diyl, butane-1,4-diyl, pentane-1,5-diyl and the like. Additionally, the alkylidene group can be optionally substituted.

As used herein, the term "alkenylene group" covers a linear-chain and branched-chain alkenylene group. When an alkenylene group having a specific carbon number is specified, it is intended to cover all geometric isomers having that carbon number. For example, the alkenylene group may be an alkenylene group having 2-20 carbon atoms, an alkenylene group having 2-15 carbon atoms, an alkenylene group having 2-10 carbon atoms, an alkenylene group having 2-5 carbon atoms, an alkenylene group having 5-20 carbon atoms, an alkenylene group having 5-15 carbon atoms or alkenylene having 5-10 carbon atoms. Representative alkenylene includes, for example, vinylidene, propenylidene, butenylidene and the like. Additionally, the alkenylene group can be optionally substituted.

As used herein, the term "aryl group" covers both monocyclic and polycyclic systems. A polycyclic ring may have two or more rings in which two carbons are shared by two adjacent rings (the rings are "fused"), wherein at least one of the rings is aromatic, for example, other rings may be a cycloalkyl group, a cycloalkenyl group, an aryl group, a group heterocyclic and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group or a $C_6$-$C_{10}$ aryl group. Representative aryl includes, for example, phenyl, methylphenyl, propylphenyl, isopropylphenyl, benzyl, naphthalen-1-yl, naphthalen-2-yl and the like. Additionally, the aryl group can be optionally substituted.

As used herein, the term "heteroaryl group" covers a monocyclic heteroaromatic group which may include one to three heteroatoms, such as pyrrole, furan, thiophene, imidazole, oxazole, thiazole, triazole, pyrazole, pyridine, pyrazine, pyrimidine and the like. The term heteroaryl group further includes a polycyclic heteroaromatic system having two or more rings in which two atoms are shared by two adjacent rings (the rings are "fused"), wherein at is least one of the rings is a heteroaryl group, and other rings may be a cycloalkyl group, a cycloalkenyl group, an aryl group, a heterocyclic group and/or a heteroaryl group. The heteroatom in the heteroaryl may be, for example, O, S, N, Se or the like. For example, the heteroaryl group may be a $C_6$-$C_{50}$ heteroaryl group, a $C_6$-$C_{40}$ heteroaryl group, a $C_6$-$C_{30}$ heteroaryl group, a $C_6$-$C_{20}$ heteroaryl group or a $C_6$-$C_{10}$ heteroaryl group. Additionally, the heteroaryl group can be optionally substituted.

As used herein, the term "silyl group" covers groups which may include one to three silicon atoms. For example, Si—$(CH_3)_3$, Si—$(CR_aR_b)_n$—Si, and the like. The silyl can be optionally substituted. $R_a$ and $R_b$ are selected from H, F, a substituted or unsubstituted $C_1$-$C_6$ alkyl group, a substituted or unsubstituted $C_2$-$C_6$ alkenyl group, a substituted or unsubstituted $C_2$-$C_6$ alkynyl group, a substituted or unsubstituted $C_3$-$C_6$ cycloalkyl group, and a substituted or unsubstituted $C_6$-$C_{12}$ aryl group, wherein when substituted, the substituent is halogen. As used herein, the term "halogen" may be F, $C_1$, Br or I.

In addition, amounts, ratios, and other numerical values are sometimes presented herein in a range format. It should be understood that such range formats are for convenience and brevity, and should be interpreted with flexibility, and not only include those numerical values that are specifically designated as range limitations, but also include all individual numerical values or sub-ranges that are within the range, as each value and sub-range is specified explicitly.

I. Electrolyte

The present application relates to an electrolyte including an organic solvent, a lithium salt and an additive, the additive including a diboronic acid compound and a nitrile compound.

The inventors of the present application found that the synergistic action of the diboronic acid compound and the nitrile compound can improve the structure of the layer on the surface of a cathode and better stabilize the structure is of the material, thereby achieving the purpose of improving high-temperature storage performance and cycle performance. According to the present application, the diboronic acid compound and the nitrile compound in the electrolyte can significantly reduce the swelling in a high-temperature storage process, and can improve the cycle life of the battery.

Diboronic Acid Compound

In some embodiments, the diboronic acid compound includes a compound of Formula (I), a compound of Formula (II) or any combination thereof:

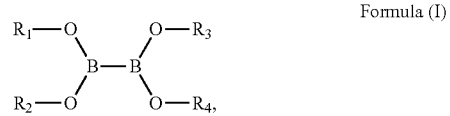

Formula (I)

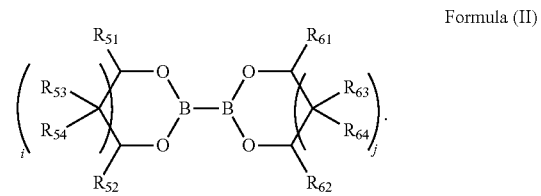

Formula (II)

In Formula (I), $R_1$, $R_2$, $R_3$ and $R_4$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, wherein when substituted, the substituent is halogen.

In Formula (II), $R_{51}$, $R_{52}$, $R_{53}$, $R_{54}$, $R_{61}$, $R_{62}$, $R_{63}$ and $R_{64}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, wherein when substituted, the substituent is halogen, and i and j are 0 or 1. $R_{53}$ and $R_{54}$ may be connected to form a ring, and $R_{63}$ and $R_{64}$ may be connected to form a ring.

The diboronic acid compounds of the above two structures are easily synthesized and have good solubility and compatibility.

In some embodiments, the compound of Formula (I) is at least one selected from the following compounds:

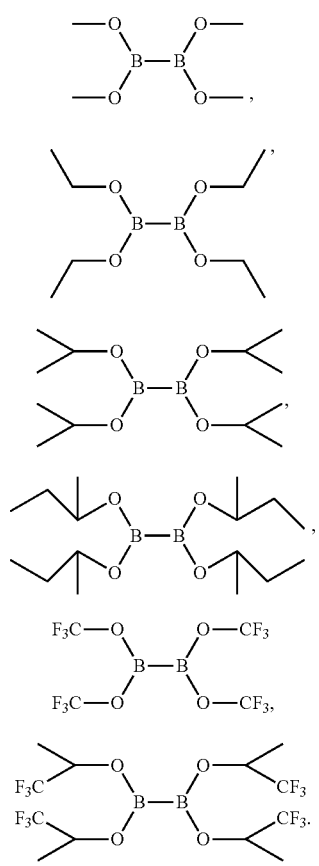

Formula (I-1)

Formula (I-2)

Formula (I-3)

Formula (I-4)

Formula (I-5)

Formula (I-6)

In some embodiments, the compound of Formula (II) is at least one selected from the following compounds:

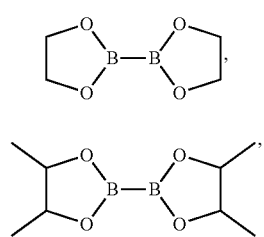

Formula (II-1)

Formula (II-2)

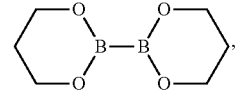

Formula (II-3)

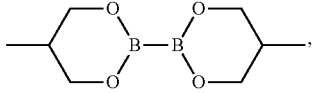

Formula (II-4)

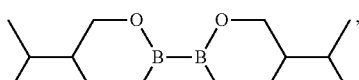

Formula (II-5)

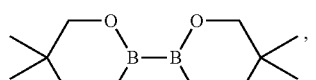

Formula (II-6)

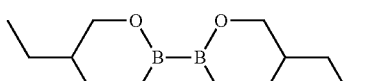

Formula (II-7)

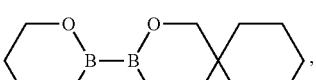

Formula (II-8)

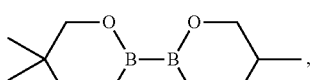

Formula (II-9)

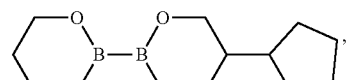

Formula (II-10)

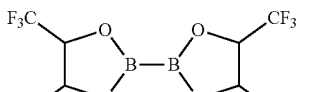

Formula (II-11)

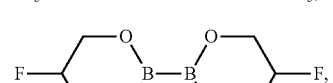

Formula (II-12)

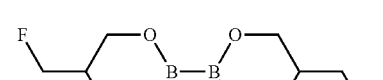

Formula (II-13)

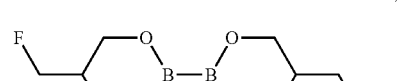

Formula (II-14) or

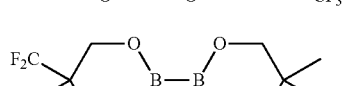

Formula (II-15)

In some embodiments, the weight percentage of the diboronic acid compound in the electrolyte may be about 0.01 wt %-about 5 wt %. In some embodiments, the weight percentage of the diboronic acid compound in the electrolyte may be about 0.1 wt %-about 5 wt %, about 1 wt %-about 5 wt %, about 1 wt %-about 2 wt %, about 1 wt %-about 3 wt %, about 1 wt %-about 4 wt %, about 0.1 wt %-about 0.5 wt %, about 0.1 wt %-about 1 wt %, about 0.1 wt %-about 2 wt %, about 0.1 wt %-about 3 wt %, about 0.1 wt %-about 4 wt % or the like.

Nitrile Compound

In some embodiments, the nitrile compound includes a compound of Formula (III), a compound of Formula (IV), a compound of Formula (V) or any combination thereof:

$$\text{Formula (III)}$$

$$\text{Formula (IV)}$$

$$\text{Formula (V)}$$

In Formula (III), $R_7$ and $R_8$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, wherein when substituted, the substituent is halogen.

In Formula (IV), a, b and c are each independently an integer of 0-10.

In Formula (V), $R_9$, $R_{10}$ and $R_{11}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, wherein when substituted, the substituent is halogen, and m, n and p are each independently an integer of 0-10.

In some embodiments, the compound of Formula (III) is at least one selected from the group consisting of succinonitrile, glutaronitrile, adiponitrile, pimelonitrile, suberonitrile, 2-methylene glutaronitrile and dipropyl malononitrile.

In some embodiments, the compound of Formula (IV) is at least one selected from the following compounds:

$$\text{Formula (IV-1)}$$

$$\text{Formula (IV-2)}$$

$$\text{Formula (IV-3)}$$

In some embodiments, the compound of Formula (V) is at least one selected from the following compounds:

$$\text{Formula (V-1)}$$

$$\text{Formula (V-2)}$$

$$\text{Formula (V-3)}$$

$$\text{Formula (V-4)}$$

$$\text{Formula (V-5)}$$

In some embodiments, the weight percentage of the nitrile compound in the electrolyte may be about 0.01 wt %-about 15 wt %. In some embodiments, the weight percentage of the nitrile compound in the electrolyte may be about 0.1 wt %-about 12 wt %, about 0.1 wt %-about 10 wt %, about 0.1 wt %-about 8 wt %, about 1 wt %-about 12 wt %, about 1 wt %-about 10 wt %, about 1 wt %-about 8 wt %, about 2 wt %-about 10 wt %, about 3 wt %-about 12 wt %, about 3 wt %-about 10 wt %, about 5 wt %-about 12 wt %, about 0.1 wt %-about 0.5 wt %, about 1 wt %-about 7 wt %, about 1 wt %-about 2 wt %, about 0.1 wt %-about 3 wt %, about 0.1 wt %-about 4 wt % or the like. When the nitrile compound is in the above content range, by cooperating with the diboronic acid compound, gas generation of the battery can be sufficiently suppressed, and the cycle life can be improved.

Phosphate Compound and Phosphite Compound

In some embodiments, the electrolyte may further include a phosphate compound, a phosphite compound or any combination thereof, the phosphate compound including a compound of Formula (VI), and the phosphite compound including a compound of Formula (VII):

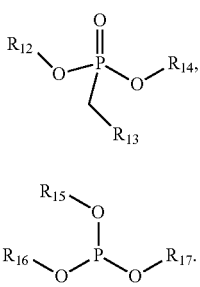
Formula (VI)

Formula (VII)

In Formula (VI), $R_{12}$, $R_{13}$ and $R_{14}$ are each independently selected from a substituted or unsubstituted $C_1$-$C_{12}$ alkyl group, a substituted or unsubstituted $C_1$-$C_{12}$ silyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, wherein when substituted, the substituent is halogen.

In Formula (VII), $R_{15}$, $R_{16}$ and $R_{17}$ are each independently selected from a substituted or unsubstituted $C_1$-$C_{12}$ linear-chain or branched-chain alkyl group, a substituted or unsubstituted $C_2$-$C_{12}$ linear-chain or branched-chain alkenyl group, a substituted or unsubstituted $C_2$-$C_{12}$ linear-chain or branched-chain alkynyl group, and a substituted or unsubstituted $C_3$-$C_{12}$ cycloalkyl group, wherein when substituted, the substituent is halogen.

In some embodiments, the compound of Formula (VI) is at least one is selected from the following compounds:

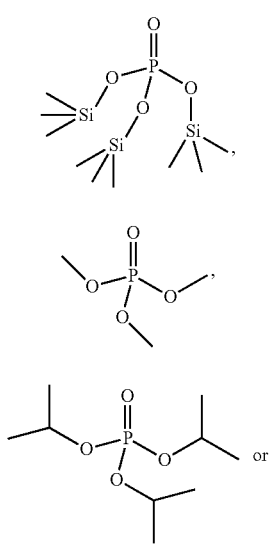

Formula (VI-1)

Formula (VI-2)

Formula (VI-3)

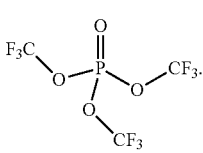

Formula (VI-4)

In some embodiments, the compound of Formula (VII) may be selected from at least one of the following compounds:

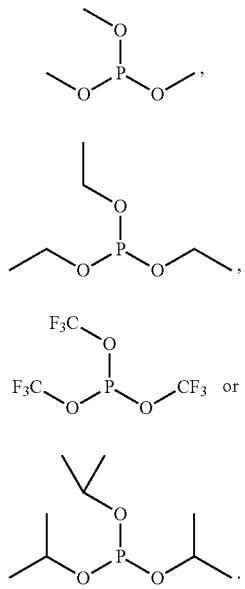

Formula (VII-1)

Formula (VII-2)

Formula (VII-3) or

Formula (VII-4)

In some embodiments, the weight percentage of the phosphate compound and the phosphite compound in the electrolyte may be about 0.01 wt %-about 5 wt %. In some embodiments, the weight percentage of the phosphate compound and the phosphite compound in the electrolyte may be about 0.1 wt %-about 5 wt %, about 1 wt %-about 5 wt %, about 1 wt %-about 2 wt %, about 1 wt %-about 3 wt %, about 1 wt %-about 4 wt %, about 0.1 wt %-about 0.5 wt %, about 0.1 wt %-about 1 wt %, about 0.1 wt %-about 2 wt %, about 0.1 wt %-about 3 wt %, about 0.1 wt %-about 4 wt % or the like.

Epoxy Silane

In some embodiments, the electrolyte may further include an epoxy silane, the epoxy silane including a compound of Formula (VIII):

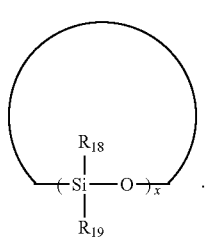

Formula (VIII)

In Formula (VIII), $R_{18}$ and $R_{19}$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, and a substituted or unsubstituted $C_1$-$C_{12}$ cycloalkyl group, and when substituted, the substituent is halogen; wherein $2 \leq x \leq 5$, and x is an integer.

In some embodiments, the compound of Formula (VIII) is at least one selected from the following compounds:

Formula (VIII-1)

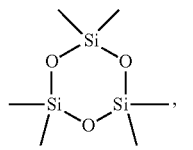

Formula (VIII-2)

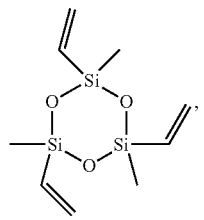

Formula (VIII-3)

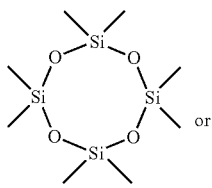

or

Formula (VIII-4)

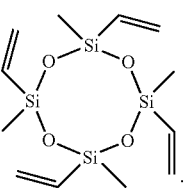

In some embodiments, the weight percentage of the epoxy silane in the electrolyte may be about 0.01 wt %-about 5 wt %. In some embodiments, the weight percentage of the epoxy silane in the electrolyte may be about 0.1 wt %-about 5 wt %, about 1 wt %-about 5 wt %, about 1 wt %-about 2 wt %, about 1 wt %-about 3 wt %, about 1 wt %-about 4 wt %, about 0.1 wt %-about 0.5 wt %, about 0.1 wt %-about 1 wt %, about 0.1 wt %-about 2 wt %, about 0.1 wt %-about 3 wt %, about 0.1 wt %-about 4 wt % or the like.

In some embodiments, the electrolyte may further include at least one of vinylene carbonate, fluoroethylene carbonate (FEC), 1,3-propane sultone (PS), vinyl sulfate, lithium difluorophosphate (LDFP), tris(trimethylsilyl) phosphate (TTSP) or trivinyl trimethylcyclotrisiloxane (TMCSi).

According to embodiments of the present application, the organic solvent used in the electrolyte of the present application may be any organic solvent known as a solvent for the electrolyte in the prior art. In some embodiments, the organic solvent may include at least one of ethylene carbonate, propylene carbonate, butylene carbonate, ethyl methyl carbonate, dimethyl carbonate, diethyl carbonate, dipropyl carbonate, methyl propyl carbonate, ethyl propyl carbonate, 1,4-butyrolactone, methyl propionate, methyl butyrate, ethyl acetate, ethyl propionate and ethyl butyrate.

According to embodiments of the present application, the lithium salt used in the electrolyte of the present application is one more selected from inorganic lithium salts or organic lithium salts. In some embodiments, the lithium salt is at least one selected from the group consisting of $LiClO_4$, $LiAsF_6$, $LiPF_6$, $LiBF_4$, $LiSbF_6$, $LiSO_3F$ and $LiN(FSO_2)_2$. In some embodiments, the lithium salt is a fluorine-containing organic lithium salt. For example, the lithium salt is at least one selected from the group consisting of $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropanedisulfonimide, cyclic lithium 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$. In some embodiments, the lithium salt can be a lithium salt containing a dicarboxylic acid complex. For example, the lithium salt may be selected from at least one of lithium bis(oxalate) borate, lithium difluoro(oxalate)borate, lithium tris(oxalate) phosphate, lithium difluorobis(oxalate)phosphate and lithium tetrafluoro(oxalate)phosphate. In some embodiments, the lithium salt can be lithium hexafluorophosphate ($LiPF_6$).

In some embodiments, the concentration of the lithium salt in the electrolyte may be about 0.5 mol/L-about 2 mol/L. In some embodiments, the concentration of the lithium salt in the electrolyte may be about 0.5 mol/L-about 1 mol/L, about 0.5 mol/L-about 0.8 mol/L, about 0.8 mol/L-about 1.2 mol/L, about 1 mol/L-about 1.5 mol/L, about 1.2 mol/L-about 2 mol/L, about 0.5 mol/L-about 1.2 mol/L or the like.

The electrolyte of the present application can be prepared by a conventional method. For example, the materials in the electrolyte are mixed uniformly.

II. Electrochemical Device

The electrochemical device of the present application includes any device that generates an electrochemical reaction, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium polymer secondary battery or a lithium-ion polymer secondary battery. In some embodiments, the electrochemical device of the present application includes a cathode having a cathode active material capable of occluding and releasing metal ions; an anode having an anode active material capable of occluding and releasing metal ions; and the electrolyte of the present application.

In some embodiments, the electrochemical device of the present application is a lithium-ion battery including a cathode containing a cathode is active material, an anode containing an anode active material, a separator and the electrolyte of the present application.

The cathode active material layer contains one or more cathode materials capable of deintercalating lithium ions as the cathode active material. The cathode active material layer may further contain other materials such as a cathode binder and a cathode conductive agent as needed.

The cathode material contains a lithium-containing compound, thereby obtaining a high energy density. Examples of the lithium-containing compound include at least one of a lithium transition metal complex oxide or a lithium transition metal phosphate compound. The lithium transition metal complex oxide is an oxide containing Li and one or more transition metal elements as constituent elements. The lithium transition metal phosphate compound is a phosphate compound containing Li and one or more transition metal elements as constituent elements. In some embodiments, the transition metal element is one or more of Co, Ni, Mn, Fe and the like, such that a higher voltage is obtained. Their chemical formulae are represented by $Li_xM1O_2$ or $Li_yM2PO_4$. In the formulae, M1 and M2 respectively represent one or more transition metal elements. The values of x and y vary depending on the charge and discharge state, and are usually in the ranges of $0.05 \leq x \leq 1.10$ and $0.05 \leq y \leq 1.10$.

Examples of the lithium transition metal complex oxide may include $LiCoO_2$, $LiNiO_2$, and a lithium nickel-based complex oxide represented by the formula $LiNi_{1-z}M_zO_2$.

Examples of the lithium transition metal phosphate compound may include $LiFePO_4$ and $LiFe_{1-u}Mn_uPO_4$ (u<1), such that a high battery capacity is obtained and excellent cycle performance is obtained.

In the formula $LiNi_{1-z}M_zO_2$, M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb and Nb, wherein z satisfies $0.005 < z < 0.5$.

For example, the lithium-containing compound may use the following compounds: $Li_aA_{1-b}H_bD_2$ (wherein $0.90 \leq a \leq 1.8$ and $0 \leq b \leq 0.5$); $Li_aE_{1-b}H_bO_{2-c}D_c$ (wherein $0.90 \leq a \leq 1.8$, $0 \leq b \leq 0.5$, $0 \leq c \leq 0.05$); $LiE_{2-b}H_bO_{4-c}D_c$ (wherein $0 \leq b \leq 0.5$ and $0 \leq c \leq 0.05$); $Li_aNi_{1-b-c}Co_bH_cD_\alpha$ (wherein $0.90 \leq a \leq 1.8$, $0 \leq b \leq 0.5$, $0 \leq c \leq 0.05$ and $0 < \alpha < 2$); $Li_aN_{1-b-c}Co_bH_cO_{2-\alpha}L_\alpha$ (wherein $0.90 \leq a \leq 1.8$, $0 \leq b \leq 0.5$, $0 \leq c \leq 0.05$ and $0 < \alpha < 2$); $Li_aN_{1-b-c}Co_bH_cO_{2-\alpha}L_2$ (wherein $0.90 \leq a \leq 1.8$, $0 \leq b \leq 0.5$, $0 \leq c \leq 0.05$ and $0 < \alpha < 2$); $Li_aNi_{1-b-c}Mn_bH_cD_\alpha$ (wherein $0.90 \leq a \leq 1.8$, $0 \leq b \leq 0.5$, $0 \leq c \leq 0.05$ and $0 < \alpha \leq 2$); $Li_aNi_{1-b-c}Mn_bH_cO_{2-\alpha}L_\alpha$ (wherein $0.90 \leq a \leq 1.8$, $0 \leq b \leq 0.5$, $0 \leq c \leq 0.05$ and $0 < \alpha < 2$); $Li_aNi_{1-b-c}Mn_bH_cO_{2-\alpha}L_2$ (wherein $0.90 \leq a \leq 1.8$, $0 \leq b \leq 0.5$, $0 \leq c \leq 0.05$ and $0 < \alpha < 2$); $Li_aNi_bE_cG_dO_2$ (wherein $0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 05$, $0 \leq d \leq 0.5$ and $0.001 \leq e \leq 0.1$); $Li_aNiG_bO_2$ (wherein $0.90 \leq a \leq 1.8$ and $0.001 \leq b \leq 0.1$); $Li_aCo_GbO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2GbO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiMO_2$; $LiNiVO_4$; $Li_{(3-f)}J_2(P_4)_3$ ($0 \leq f \leq 2$); $Li_{(3-f)}Fe_2(PO_4)_3$ ($0 \leq f \leq 2$) or $LiFePO_4$. In the above chemical formulae, A is Ni, Co, Mn or a combination thereof; H is Al, Ni, Co, Mn, Cr, Fe, Mg, Sr, V, a rare earth element or a combination thereof; D is O, F, S, P or a combination thereof, and E is Co, Mn or a combination thereof; L is F, S, P or a combination thereof; G is Al, Cr, Mn, Fe, Mg, La, Ce, Sr, V or a combination thereof; Q is Ti, Mo, Mn or a combination thereof; M is Cr, V, Fe, Sc, Y or a combination thereof; and J is V, Cr, Mn, Co, Ni, Cu or a combination thereof.

The lithium intercalation compound may have a coating on its surface or may be mixed with another compound having a coating. The coating may include at least one coating element compound selected from an oxide of a coating element, a hydroxide of a coating element, an oxyhydroxide of a coating element, an oxycarbonate of a coating element, or a hydroxycarbonate of a coating element. The coating element compound of the coating may be amorphous or crystalline. The coating element included in the coating may include Mg, Al, Co, K, Na, Ca, Si, Ti, V, Sn, Ge, Ga, B, As, Zr or a mixture thereof. By using these elements in the compound, the coating can be placed by a method which has no adverse effect (or has substantially no adverse effect) on the properties of the cathode active material. For example, the coating can be placed by a method such as spraying, dipping, or the like. However, these methods will not be explained in more detail as they are known to those working in related fields.

In addition, the cathode material may further include an oxide, a disulfide, a chalcogenide, a conductive polymer and the like. Examples of the oxide include titanium oxide, vanadium oxide and manganese dioxide. Examples of the disulfide include titanium disulfide and molybdenum sulfide. Examples of the chalcogenide include niobium selenide. Examples of the conductive polymer include sulfur, polyaniline and polythiophene. However, the cathode material is not limited to the above materials.

The cathode conductive agent may be a carbon material, a metal material, a conductive polymer, or the like, and any conductive material can be used as the conductive agent as long as it does not cause chemical changes in the battery.

Examples of the conductive agent may include a carbon-based material, such as natural graphite, artificial graphite, carbon black, acetylene black, Ketjen black, carbon fiber and the like; a metal-based material including a metal powder or metal fiber containing one or more of copper, nickel, aluminum or silver; a conductive polymer, such as a polyphenylene derivative; or a mixture thereof.

The specific type of the anode active material of the present application is not particularly limited and can be selected according to requirements. Specifically, the anode active material may be selected from at least one of natural graphite, artificial graphite, mesocarbon microbead (abbreviated as MCMB), hard carbon, soft carbon, silicon, silicon-carbon composite, Li—Sn alloy, Li—Sn—O alloy, Sn, SnO, $SnO_2$, spinel structure lithiated $TiO_2$-$L_4Ti_5O_{12}$ and Li—Al alloy, wherein the silicon-carbon composite means that at least about 20 wt % of silicon is contained based on the weight of the silicon-carbon anode active material.

The separator of the present application may be selected from at least one of polyethylene, polypropylene, polyethylene terephthalate, polyimide and aramid. In particular, the polyethylene and polypropylene, which have a good effect on preventing short circuits, can improve the stability of the battery by the shutdown effect. In some embodiments, the polyethylene may include at least one selected from high-density polyethylene, low-density polyethylene and ultra-high-molecular-weight polyethylene.

The separator of the present application may include a porous layer provided on at least one surface of the separator. The porous layer on the surface of the separator can improve the heat resistance, oxidation resistance and electrolyte wettability of the separator, and enhance the binding property between the separator and the electrode.

In some embodiments, the porous layer may include inorganic particles and a binder. In some embodiments, the inorganic particles include at least one selected from of the group consisting of aluminum oxide ($Al_2O_3$), silicon dioxide ($SiO_2$), magnesium oxide (MgO), titanium oxide ($TiO_2$), hafnium oxide ($HfO_2$), tin oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide and barium sulfate. In some embodiments, the binder is at least one selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethylcellulose, polyvinylpyrrolidone, polyvinyl ether, polymethyl methacrylate, polytetrafluoroethylene and polyhexafluoropropylene.

III. Examples

The performance evaluation of the examples and comparative examples of the lithium-ion battery according to the present application is explained below. It should be understood that these examples are only for illustrating the present application and are not intended to limit the scope of the present application.

1. Preparation of Lithium-Ion Battery

A cathode active material, lithium cobalt oxide ($LiCoO_2$), a conductive agen(Super P), and polyvinylidene fluoride were mixed according to a weight ratio of 97:1.4:1.6, then N-methylpyrrolidone (NMP) was added, and the mixture was uniformly stirred under the action of a vacuum mixer to obtain a cathode slurry, wherein the solid content of the cathode slurry was 72 wt %. A cathode current collector aluminum foil was uniformly coated with the cathode slurry, and the aluminum foil was dried at 85° C., then subjected to cold pressing, cutting and slitting, and then dried in vacuum at 85° C. for 4 h to obtain a cathode.

An anode active material, artificial graphite, a conductive agent(Super P), sodium carboxymethylcellulose (CMC) and a binder(styrene-butadiene rubber (SBR)), were mixed according to a weight ratio of 96.4:1.5:0.5:1.6, then deionized water was added, and the mixture was stirred under the action of a vacuum mixer to obtain an anode slurry, wherein the solid content of the anode slurry was 54 wt %; an anode current collector(copper) foil was uniformly coated with the anode slurry; and the copper foil was dried at 85° C., and then subjected to cold pressing, cutting and slitting, and then dried in a vacuum at 120° C. for 12 h to obtain an anode.

In a dry argon atmosphere glove box, ethylene carbonate (EC), ethyl methyl carbonate (EMC) and diethyl carbonate (DEC) were mixed according to a weight ratio of EC:EMC:DEC=30:50:20. Then, an additive was added, dissolved and thoroughly stirred, then a lithium salt ($LiPF_6$) was added, and the mixture was uniformly mixed to obtain an electrolyte. The concentration of the $LiPF_6$ was 1.05 mol/L. The specific types and contents of the additives used in the electrolyte are shown in the tables below. In the tables below, the content of the additive is a weight percentage calculated based on the total weight of the electrolyte.

A 16 μm thick polyethylene (PE) separator was used.

The cathode, the separator and the anode were stacked in order such that the separator had a separation function between the cathode and anode, and then were wound and welded with tabs, placed in an outer packaging foil (aluminum plastic film), and dried. The electrolyte prepared as above was injected, and subjected to such working procedures as vacuum encapsulation, standing, formation, shaping, and capacity testing to obtain a lithium-ion battery.

2. Test Method (1) Lithium-Ion Battery Cycle Performance Test

The lithium-ion battery was placed in a 25° C. incubator and allowed to stand for 30 minutes to bring the lithium-ion battery to a constant temperature. The battery was charged at a constant current of 1.5 C to a voltage of 4.3 V, then charged at a constant voltage of 4.3 V to a current of 0.05 C, and discharged at a constant current of 3 C to a voltage of 3.0 V, which is a charge and discharge cycle. The capacity of the first discharge was 100%, the charge and discharge cycle was repeated for 600 times, the test was stopped, and the cycle capacity retention rate was recorded as an index for evaluating the cycle performance of the lithium-ion battery. The thickness variation of the lithium-ion battery was tested every 100 times.

The cycle capacity retention rate was the capacity when it was cycled to a certain time divided by the capacity at the time of the first discharge.

The cycle thickness variation refers to the thickness of the battery when it is recycled to a certain time minus the initial thickness of the battery, and then divided by the initial thickness of the battery. At the same time, the 45° C. cycle performance of the lithium-ion battery was tested. The test method was the same with the above 25° C. cycle performance test, and the temperature was changed to 45° C.

(2) Lithium-Ion Battery 140° C. Hotbox Test

The lithium-ion battery was placed in a 25° C. incubator and allowed to stand for 30 minutes to bring the lithium-ion battery to a constant temperature. The battery was charged at a constant current of 0.5 C to 4.3 V, and charged at a constant voltage to a current of 0.05 C. The battery was then transferred to a hotbox and heated to 140° C. at a rate of 2° C./min for 30 min. The passing standard was: the battery did not burn or explode.

(3) Lithium-Ion Battery Direct Current Internal Resistance (DCIR) Test

The lithium-ion battery was placed in a 25° C. incubator and allowed to stand for 30 minutes to bring the lithium-ion battery to a constant temperature. The battery was charged at a constant current of 0.5 C to 4.3 V, and charged at a constant voltage to a current of 0.05 C. Then the incubator was adjusted to a temperature of −10° C., and allowed to stand for 120 minutes. The battery was discharged at a constant current of 0.1 C (the discharge current was $I_1$ at this time) for 5 h, the voltage $V_1$ was recorded, the battery was discharged at a DC of 1 C (the discharge current was 12 at this time) for 1s, the voltage $V_2$ was recorded, and 50% SOC DCR=$(V_1-V_2)/(I_2-I_1)$.

(4) Lithium-Ion Battery Over-Discharge Storage Performance Test

The lithium-ion battery was placed in a 25° C. incubator and allowed to stand for 30 minutes to bring the lithium-ion battery to a constant temperature. The battery was discharged at a constant current of 0.5 C to 3.0 V, allowed to stand for 30 minutes, continuously discharged at 0.1 C to 3.0 V, and finally discharged at 0.01 C to 1.0 V. After the discharge, the battery was placed in a 60° C. incubator, and the thickness variation was observed. The number of storage days when the thickness variation exceeded 10% was calculated with a thickness variation of 10% as a standard.

3. Test results

TABLE 1

Test results of diboronic acid compound and nitrile compound additives

| | Diboronic Acid Compound | | Nitrile Compound | | | 600 Cycles | | 140° C. |
| | | | | | | | | |
| | Type | Addition Amount | Type | Addition Amount | Other Additives | Capacity Retention Rate | Cycle Thickness Variation | Hotbox 30 min |
|---|---|---|---|---|---|---|---|---|
| Comparative Example 1-1 | \ | \ | \ | \ | \ | 70.40% | 9.60% | 0/10 pass |
| Comparative Example 1-2 | \ | | 1,3,6-hexanetricarbonitrile | 1.0% | \ | 75.62% | 9.50% | 3/10 pass |
| Comparative Example 1-3 | Formula (II-6) | 0.5% | \ | \ | \ | 76.59% | 9.12% | 2/10 pass |
| Example 1-1 | Formula (II-6) | 0.1% | 1,3,6-hexanetricarbonitrile | 1.0% | \ | 81.20% | 8.90% | 3/10 pass |

TABLE 1-continued

Test results of diboronic acid compound and nitrile compound additives

| | Diboronic Acid Compound | | Nitrile Compound | | | 600 Cycles | | 140° C. |
| | | | | | | Capacity | Cycle | |
| | Type | Addition Amount | Type | Addition Amount | Other Additives | Retention Rate | Thickness Variation | Hotbox 30 min |
| --- | --- | --- | --- | --- | --- | --- | --- | --- |
| Example 1-2 | Formula (II-6) | 0.3% | 1,3,6-hexanetricarbonitrile | 1.0% | \ | 81.80% | 8.70% | 4/10 pass |
| Example 1-3 | Formula (II-6) | 0.5% | 1,3,6-hexanetricarbonitrile | 1.0% | \ | 83.40% | 8.60% | 4/10 pass |
| Example 1-4 | Formula (II-6) | 1.0% | 1,3,6-hexanetricarbonitrile | 1.0% | \ | 83.60% | 8.60% | 5/10 pass |
| Example 1-5 | Formula (II-6) | 2.0% | 1,3,6-hexanetricarbonitrile | 1.0% | \ | 83.70% | 8.55% | 5/10 pass |
| Example 1-6 | Formula (II-6) | 5.0% | 1,3,6-hexanetricarbonitrile | 1.0% | \ | 81.80% | 8.75% | 7/10 pass |
| Example 1-7 | Formula (II-6) | 0.5% | 1,3,6-hexanetricarbonitrile | 0.1% | \ | 80.80% | 8.92% | 2/10 pass |
| Example 1-8 | Formula (II-6) | 0.5% | 1,3,6-hexanetricarbonitrile | 0.5% | \ | 80.90% | 8.87% | 4/10 pass |
| Example 1-9 | Formula (II-6) | 0.5% | 1,3,6-hexanetricarbonitrile | 2.0% | \ | 83.52% | 8.50% | 5/10 pass |
| Example 1-10 | Formula (II-6) | 0.5% | 1,3,6-hexanetricarbonitrile | 5.0% | \ | 83.61% | 8.52% | 6/10 pass |
| Example 1-11 | Formula (II-6) | 0.5% | adiponitrile + 1,3,6-hexanetricarbonitrile | 5.0% + 3% | \ | 83.62% | 8.51% | 6/10 pass |
| Example 1-12 | Formula (II-6) | 0.5% | adiponitrile + 1,3,6-hexanetricarbonitrile | 5.0% + 5% | \ | 83.60% | 8.50% | 7/10 pass |
| Example 1-13 | Formula (I-3) | 0.1% | 1,3,6-hexanetricarbonitrile | 1.0% | \ | 80.78% | 8.88% | 4/10 pass |
| Example 1-14 | Formula (I-3) | 0.5% | 1,3,6-hexanetricarbonitrile | 1.0% | \ | 82.90% | 8.62% | 6/10 pass |
| Example 1-15 | Formula (I-3) | 1.0% | 1,3,6-hexanetricarbonitrile | 1.0% | \ | 83.00% | 8.53% | 7/10 pass |
| Example 1-16 | Formula (I-3) | 0.3% | adiponitrile | 0.5% | \ | 81.50% | 9.03% | 5/10 pass |
| Example 1-17 | Formula (I-3) | 0.3% | adiponitrile | 1.0% | \ | 82.20% | 8.81% | 5/10 pass |
| Example 1-18 | Formula (I-3) | 0.3% | adiponitrile | 3.0% | \ | 82.42% | 8.78% | 7/10 pass |
| Example 1-19 | Formula (I-5) | 0.3% | 1,2,6-hexanetricarbonitrile | 2.0% | \ | 83.21% | 8.67% | 6/10 pass |
| Example 1-20 | Formula (II-6) + Formula (II-3) | 0.5% + 0.3% | 1,2,6-hexanetricarbonitrile | 2.0% | \ | 82.50% | 8.75% | 5/10 pass |
| Example 1-21 | Formula (II-6) | 0.5% | 1,3,6-hexanetricarbonitrile | 1.0% | 3.0% PS | 85.30% | 8.23% | 8/10 pass |
| Example 1-22 | Formula (II-6) | 0.5% | 1,3,6-hexanetricarbonitrile | 1.0% | 0.1% PS | 83.62% | 8.53% | 5/10 pass |
| Example 1-23 | Formula (II-6) | 0.5% | 1,3,6-hexanetricarbonitrile | 1.0% | 1.0% FEC | 84.61% | 8.33% | 5/10 pass |
| Example 1-24 | Formula (II-6) | 0.5% | 1,3,6-hexanetricarbonitrile | 1.0% | 0.1% FEC | 83.21% | 8.41% | 6/10 pass |
| Example 1-25 | Formula (II-6) | 0.5% | 1,3,6-hexanetricarbonitrile | 1.0% | 1.0% FEC + 0.3% LDFP | 85.92% | 8.18% | 8/10 pass |
| Example 1-26 | Formula (II-6) | 0.5% | 1,3,6-hexanetricarbonitrile | 1.0% | 3.0% PS + 0.3% LDFP | 86.00% | 8.25% | 9/10 pass |
| Example 1-27 | Formula (I-2) | 0.3% | succinonitrile | 1.0% | 3.0% PS + 0.3% LDFP | 85.25% | 8.39% | 7/10 pass |

As shown in Table 1, by comparing Example 1-1 to Example 1-20 with Comparative Example 1-1, Comparative Example 1-2 and Comparative Example 1-3, the simultaneous addition of the diboronic acid compound (for example, Formula (II-6), Formula (I-3)) and the nitrile compound (for example, 1,3,6-hexanetricarbonitrile, adiponitrile) can improve the cycle performance and cycle thickness variation of the battery, and can also improve the 140° C. hotbox performance. The main reason is that the two together work to stabilize the structure of the cathode material, and at the same time, a cathode protective film can be formed to reduce the damage of the electrolyte to the structure of the cathode material.

Example 1-21 to Example 1-27 show that the addition of PS, FEC and lithium difluorophosphate (LDFP) at the same time with the addition of the diboronic acid compound and the nitrile compound can further improve the battery performance. That is because the combination of the above substances simultaneously increases the stability of the cathode and anode of the lithium-ion battery, and the safety performance of the lithium-ion battery can be improved.

TABLE 2

Test results of diboronic acid compound, nitrile compound and phosphate compound (or phosphite compound) additives

| Table 2 | Diboronic Acid Compound | | Nitrile Compound | | Phosphate Compound (or Phosphite Compound) | 600 Cycles | | 140° C. | |
|---|---|---|---|---|---|---|---|---|---|
| | Type | Addition Amount | Type | Addition Amount | | Capacity Retention Rate | Cycle Thickness Variation | Hotbox 30 min | DCIR (mohm) |
| Example 1-3 | Formula (II-6) | 0.5% | 1,3,6-hexanetricarbonitrile | 1.0% | \ | 83.40% | 8.60% | 4/10 pass | 88.2 |
| Example 2-1 | Formula (II-6) | 0.5% | 1,3,6-hexanetricarbonitrile | 1.0% | 0.1% Formula (VI-1) | 83.92% | 8.32% | 6/10 pass | 83.5 |
| Example 2-2 | Formula (II-6) | 0.5% | 1,3,6-hexanetricarbonitrile | 1.0% | 0.3% Formula (VI-1) | 83.88% | 8.29% | 7/10 pass | 82.3 |
| Example 2-3 | Formula (II-6) | 0.5% | 1,3,6-hexanetricarbonitrile | 1.0% | 2.0% Formula (VI-1) | 82.55% | 8.20% | 9/10 pass | 83.7 |
| Example 2-4 | Formula (II-6) | 0.5% | 1,3,6-hexanetricarbonitrile | 1.0% | 0.5% Formula (VI-3) | 83.74% | 8.23% | 8/10 pass | 82.8 |
| Example 2-5 | Formula (II-6) | 0.5% | 1,3,6-hexanetricarbonitrile | 1.0% | 0.5% Formula (VI-4) | 83.68% | 8.25% | 8/10 pass | 84.0 |
| Example 2-6 | Formula (II-6) | 0.5% | 1,3,6-hexanetricarbonitrile | 1.0% | 0.5% Formula (VII-2) | 83.71% | 8.25% | 8/10 pass | 82.1 |
| Example 2-7 | Formula (II-6) | 0.5% | 1,3,6-hexanetricarbonitrile | 1.0% | 0.5% Formula (VII-3) | 83.28% | 8.30% | 8/10 pass | 82.5 |

By comparing Examples 2-1 to 2-7 with Example 1-3, based on the addition of the diboronic acid compound and the nitrile compound to the electrolyte, further addition of the phosphate compound or the phosphite compound can improve the direct current internal resistance (DCIR) of the battery while ensuring good cycle performance and hotbox performance of the battery. That is mainly because they work together to facilitate the transmission of lithium ions, thereby reducing the direct current internal resistance of the battery.

By comparing Examples 3-1 to 3-4 with Example 1-3, based on the addition of the diboronic acid compound and the nitrile compound to the electrolyte, further addition of the epoxy silane ensures the cycle performance and hotbox performance of the battery, and also improves the over-discharge storage performance of the battery. The main reason is that the over-discharge storage process has higher requirements on the thermal stability of the battery interface protective layer, and the combination of the diboronic acid compound, the nitrile compound and the epoxy silane can

TABLE 3

Test results of diboronic acid compound, nitrile compound and epoxy silane additives

| Table 3 | Diboronic Acid Compound | | Nitrile Compound | | Epoxy Silane | 600 Cycles | | 140° C. Hot Box 30 min | Over-discharge Storage (d) |
|---|---|---|---|---|---|---|---|---|---|
| | Type | Addition Amount | Type | Addition Amount | | Capacity Retention Rate | Cycle Thickness Variation | | |
| Example 1-3 | Formula (II-6) | 0.5% | 1,3,6-hexanetricarbonitrile | 1.0% | \ | 83.40% | 8.60% | 4/10 pass | 10 |
| Example 3-1 | Formula (II-6) | 0.5% | 1,3,6-hexanetricarbonitrile | 1.0% | 0.1% Formula (VIII-2) | 83.84% | 8.27% | 7/10 pass | 15 |
| Example 3-2 | Formula (II-6) | 0.5% | 1,3,6-hexanetricarbonitrile | 1.0% | 0.3% Formula (VIII-2) | 84.21% | 8.20% | 8/10 pass | 15 |
| Example 3-3 | Formula (II-6) | 0.5% | 1,3,6-hexanetricarbonitrile | 1.0% | 2.0% Formula (VIII-2) | 83.42% | 8.42% | 8/10 pass | 18 |
| Example 3-4 | Formula (II-6) | 0.5% | 1,3,6-hexanetricarbonitrile | 1.0% | 0.5% Formula (VIII-1) | 83.59% | 8.51% | 7/10 pass | 15 | form a protective layer and have better thermal stability, thereby improving the over-discharge storage performance of the battery.

compound), and the epoxy silane additives can work together to further enhance the interface protection of the electrode material.

TABLE 4

Test results of diboronic acid compound, nitrile compound, phosphate compound (or phosphite compound) and epoxy silane additives

| Table 4 | Diboronic Acid Compound Type | Addition Amount | Nitrile Compound Type | Addition Amount | Phosphate Compound (or Phosphite Compound) + Epoxy Silane | Other Additives | 600 Cycles Capacity Retention Rate | 600 Cycles Cycle Thickness Variation | 140° C. Hot Box 30 min | Over-discharge Storage (d) | DCIR (mohm) |
|---|---|---|---|---|---|---|---|---|---|---|---|
| Example 1-3 | Formula (II-6) | 0.5% | 1,3,6-hexanetricarbonitrile | 1.0% | \ | \ | 83.40% | 8.60% | 4/10 pass | 10 | 88.2 |
| Example 4-1 | Formula (II-6) | 0.5% | 1,3,6-hexanetricarbonitrile | 1.0% | 0.5% Formula (VI-1) + 0.3% Formula (VIII-2) | \ | 85.11% | 8.12% | 9/10 pass | 18 | 85.7 |
| Example 4-2 | Formula (II-6) | 0.5% | 1,2,6-hexanetricarbonitrile | 1.0% | 0.5% Formula (VII-3) + 0.3% Formula (VIII-4) | \ | 85.42% | 8.15% | 9/10 pass | 18 | 86.4 |
| Example 4-3 | Formula (II-6) | 0.5% | 1,3,6-hexanetricarbonitrile + succinonitrile | 2.0% | 0.5% Formula (VI-4) + 0.5% Formula (VIII-3) | \ | 85.81% | 8.12% | 8/10 pass | 15 | 85.3 |
| Example 4-4 | Formula (II-9) | 0.5% | 1,3,6-hexanetricarbonitrile | 1.0% | 1.0% Formula (VI-2) + 0.3% Formula (VII-4) | \ | 84.95% | 8.19% | 9/10 pass | 18 | 85.0 |
| Example 4-5 | Formula (II-9) | 0.5% | Formula (V-1) | 2.0% | 0.5% Formula (VI-1) + 0.3% Formula (VIII-2) | \ | 84.97% | 8.18% | 9/10 pass | 18 | 86.1 |
| Example 4-6 | Formula (II-6) | 0.5% | 1,3,6-hexanetricarbonitrile | 1.0% | 0.5% Formula (VI-1) + 0.3% Formula (VIII-2) | 3% PS | 85.65% | 8.02% | 9/10 pass | 21 | 84.9 |
| Example 4-7 | Formula (II-6) | 0.5% | 1,3,6-hexanetricarbonitrile | 1.0% | 0.5% Formula (VI-4) + 0.5% Formula (VIII-3) | 3% PS + 2% FEC | 86.19% | 7.91% | 9/10 pass | 24 | 85.3 |
| Example 4-8 | Formula (II-9) | 0.5% | Formula (V-1) | 2.0% | 0.5% Formula (VI-1) + 0.3% Formula (VIII-2) | 3% PS + 0.3% LDFP | 86.13% | 7.88% | 10/10 pass | 24 | 84.8 |

By comparing Examples 4-1 to 4-5 with Example 1-3, the diboronic acid compound, the nitrile compound, the phosphate compound (or phosphite compound) and the epoxy silane can work together to simultaneously cope with the problems of the cyclethickness expansion problem, theover-discharge storage problem and the direct current internal resistance (DCIR) of the battery. That is because the combination of the four substances can forma better protective layer respectively on the cathode and anode of the battery, reduce the reaction of the electrolyte in the cathode and anode, and improve the cycle performance, hotbox performance, direct current internal resistance and over-discharge storage performance of the battery.

By comparing Examples 4-6 to 4-8 with Example 4-1, Example 4-3 and Example 4-5, based on the addition of the diboronic acid compound, the nitrile compound, the phosphate compound (or phosphite compound) and the epoxy silane in the electrolyte, further addition of other additives (for example, PS, FEC, LDFP) can further improve the cycle performance, hotbox performance, over-discharge storage performance and direct current internal resistance of the battery. That is because the diboronic acid compound, the nitrile compound, the phosphate compound (or phosphite References throughout the specification to "embodiments", "partial embodiments", "an embodiment", "another example", "examples", "specific examples" or "partial examples" mean that at least one embodiment or example of the present application includes specific features, structures, materials or characteristics described in the embodiments or examples. Therefore, descriptions appearing throughout the specification, such as "in some is embodiments", "in the embodiments", "in an embodiment", "in another example", "in an example", "in a specific example" or "examples", are not necessarily referring to the same embodiments or examples in the present application. Furthermore, the specific features, structures, materials or characteristics herein may be combined in any suitable manner in one or more embodiments or examples.

Although the illustrative embodiments have been shown and described, it should be understood by those skilled in the art that the above-described embodiments are not to be construed as limiting the present application, and variations, substitutions and modifications may be made to the embodiments without departing from the spirit, principles and scope of the present application.

What is claimed is:

1. An electrolyte, comprising a diboronic acid compound and a nitrile compound,
wherein the diboronic acid compound comprises a compound of Formula (I), a compound of Formula (II) or any combination thereof:

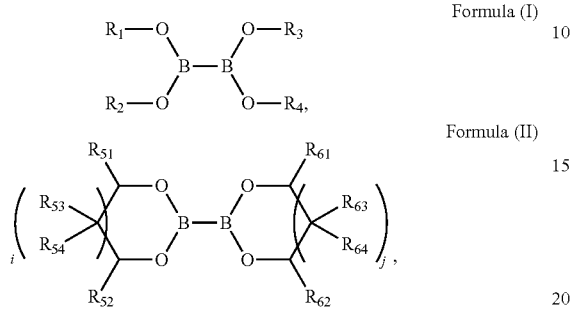

wherein $R_1$, $R_2$, $R_3$ and $R_4$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen;

$R_{51}$, $R_{52}$, $R_{53}$, $R_{54}$, $R_{61}$, $R_{62}$, $R_{63}$ and $R_{64}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; $R_{53}$ and $R_{54}$ are connectable to form a ring, and $R_{63}$ and $R_{64}$ are connectable to form a ring; and i and j are 0 or 1, the nitrile compound comprises a compound of Formula (III), a compound of Formula (IV), a compound of Formula (V) or any combination thereof:

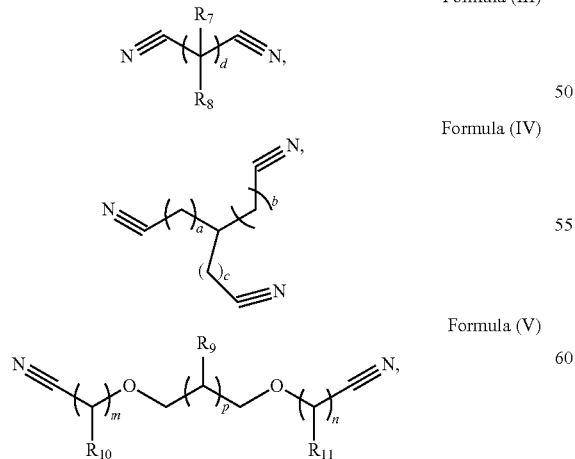

wherein $R_7$, $R_8$, $R_9$, $R_{10}$ and $R_{11}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; and a, b, c, d, m, n and p are each independently an integer of 0-10, wherein a weight percentage of the diboronic acid compound in the electrolyte is about 0.01 wt %-about 5 wt %, and a weight percentage of the nitrile compound in the electrolyte is about 0.01 wt %-about 15 wt %, and wherein the electrolyte further comprises a phosphate compound, a phosphite compound or any combination thereof, the phosphate compound comprising a compound of Formula (VI), the phosphite compound comprising a compound of Formula (VII):

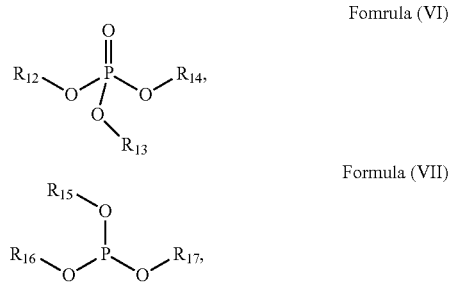

wherein $R_{12}$, $R_{13}$ and $R_{14}$ are each independently selected from a substituted or unsubstituted $C_1$-$C_{12}$ alkyl group, a substituted or unsubstituted $C_1$-$C_{12}$ silyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; and $R_{15}$, $R_{16}$ and $R_{17}$ are each independently selected from a substituted or unsubstituted $C_1$-$C_{12}$ linear-chain or branched-chain alkyl group, a substituted or unsubstituted $C_2$-$C_{12}$ linear-chain or branched-chain alkenyl group, a substituted or unsubstituted $C_2$-$C_{12}$ linear-chain or branched-chain alkynyl group, and a substituted or unsubstituted $C_3$-$C_{12}$ cycloalkyl group, and when substituted, the substituent is halogen.

2. The electrolyte according to claim 1, wherein the compound of Formula (I) or Formula (II) is at least one selected from the following compounds:

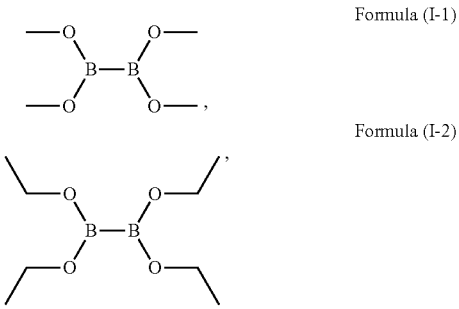

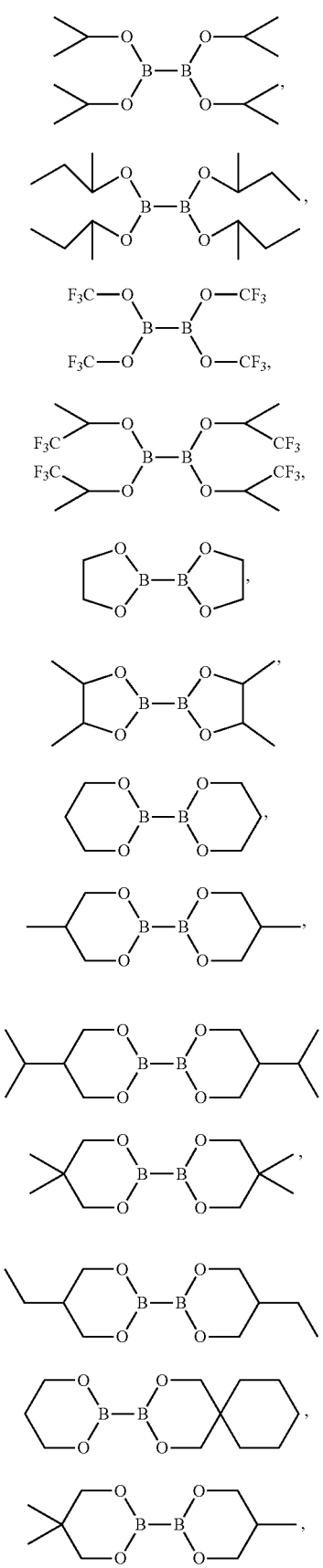

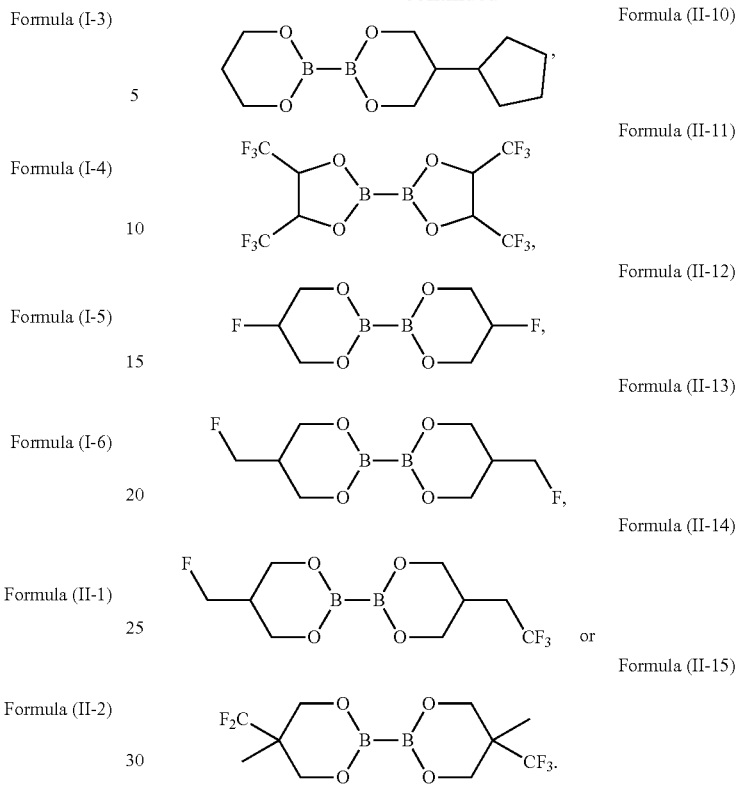

3. The electrolyte according to claim 1, wherein the compound of Formula (III) is at least one selected from the group consisting of succinonitrile, glutaronitrile, adiponitrile, pimelonitrile, suberonitrile, 2-methylene glutaronitrile and dipropyl malononitrile.

4. The electrolyte according to claim 1, wherein the compound of Formula (IV) or Formula (V) is at least one selected from the following compounds:

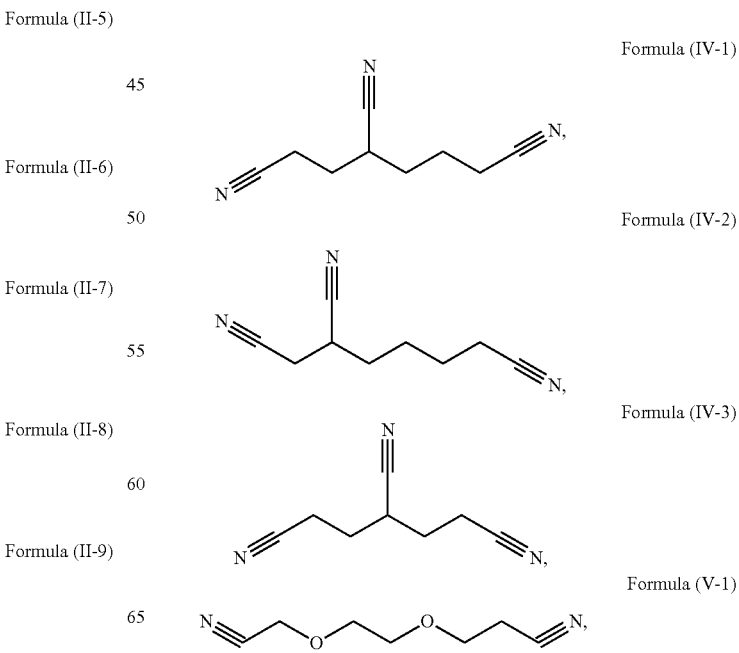

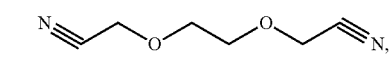

Formula (V-2)

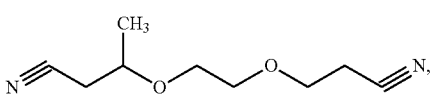

Formula (V-3)

Formula (V-4)

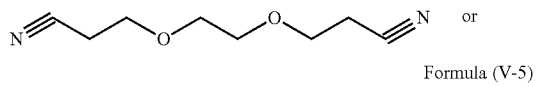

Formula (V-5)

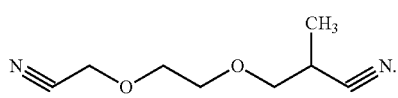

5. The electrolyte according to claim 1, wherein the compound of Formula (VI) or the compound of Formula (VII) is at least one selected from the following compounds:

Formula (VI-1)

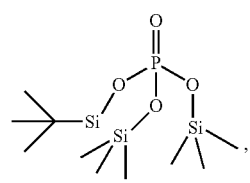

Formula (VI-2)

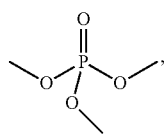

Formula (VI-3)

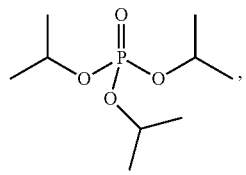

Formula (VI-4)

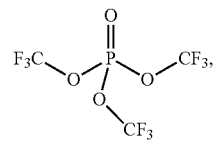

Formula (VII-1)

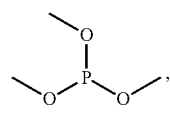

Formula (VII-2)

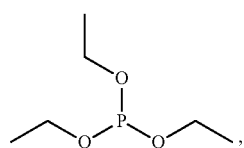

Formula (VII-3)

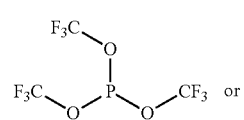

Formula (VII-4)

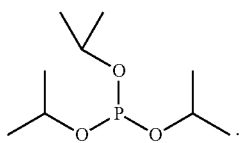

6. The electrolyte according to claim 1, wherein the electrolyte further comprises an epoxy silane, the epoxy silane comprising a compound of Formula (VIII):

Formula (VIII)

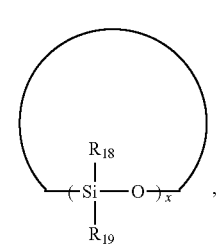

wherein $R_{18}$ and $R_{19}$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, and a substituted or unsubstituted $C_3$-$C_{12}$ cycloalkyl group, and when substituted, the substituent is halogen;

wherein $2 \leq x \leq 5$, and x is an integer.

7. The electrolyte according to claim 6, wherein the compound of Formula (VIII) is at least one selected from the following compounds:

Formula (VIII-1)

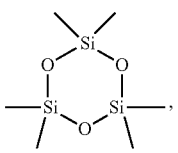

Formula (VIII-2)

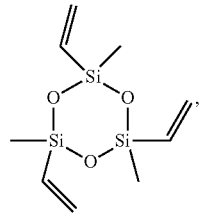

Formula (VIII-3)

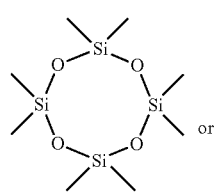

or

-continued

Formula (VIII-4)

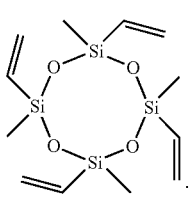

8. The electrolyte according to claim 1, wherein the electrolyte further comprises one or more of vinylene carbonate, fluoroethylene carbonate, 1,3-propane sultone, vinyl sulfate, lithium difluorophosphate, tris(trimethylsilyl) phosphate or trivinyl trimethylcyclotrisiloxane.

9. An electrochemical device, comprising a cathode containing a cathode active material, an anode containing an anode active material, a separator, and an electrolyte comprising a diboronic acid compound and a nitrile compound, wherein the diboronic acid compound comprises a compound of Formula (I), a compound of Formula (II) or any combination thereof:

Formula (I)

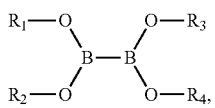

Formula (II)

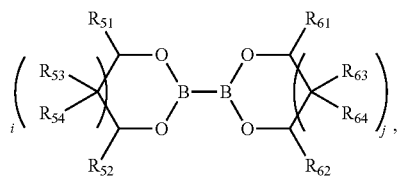

wherein $R_1$, $R_2$, $R_3$ and $R_4$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen;

$R_{51}$, $R_{52}$, $R_{53}$, $R_{54}$, $R_{61}$, $R_{62}$, $R_{63}$ and $R_{64}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; $R_{53}$ and $R_{54}$ are connectable to form a ring, and $R_{63}$ and $R_{64}$ are connectable to form a ring; and i and j are 0 or 1, the nitrile compound comprises a compound of Formula (III), a compound of Formula (IV), a compound of Formula (V) or any combination thereof:

Formula (III)

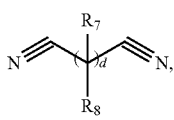

Formula (IV)

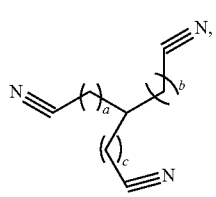

Formula (V)

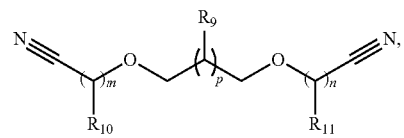

wherein $R_7$, $R_8$, $R_9$, $R_{10}$ and $R_{11}$ are each independently selected from hydrogen, halogen, a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; and a, b, c, d, m, n and p are each independently an integer of 0-10, wherein a weight percentage of the diboronic acid compound in the electrolyte is about 0.01 wt %-about 5 wt %, and a weight percentage of the nitrile compound in the electrolyte is about 0.01 wt %-about 15 wt %, and wherein the electrolyte further comprises a phosphate compound, a phosphite compound or any combination thereof, the phosphate compound comprising a compound of Formula (VI), the phosphite compound comprising a compound of Formula (VII):

Formula (VI)

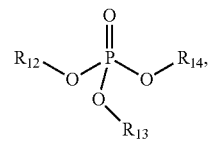

Formula (VII)

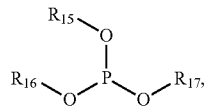

wherein $R_{12}$, $R_{13}$ and $R_{14}$ are each independently selected from a substituted or unsubstituted $C_1$-$C_{12}$ alkyl group, a substituted or unsubstituted $C_1$-$C_{12}$ silyl group, a substituted or unsubstituted $C_2$-$C_{12}$ alkenyl group, a substituted or unsubstituted $C_2$-$C_{12}$ alkynyl group, a substituted or unsubstituted $C_3$-$C_{12}$ cycloalkyl group, and a substituted or unsubstituted $C_6$-$C_{12}$ aryl group, and when substituted, the substituent is halogen; and $R_{15}$, $R_{16}$ and $R_{17}$ are each independently selected from a substituted or unsubstituted $C_1$-$C_{12}$ linear-chain or branched-chain alkyl group, a substituted or unsubstituted $C_2$-$C_{12}$ linear-chain or branched-chain alkenyl group, a substituted or unsubstituted $C_2$-$C_{12}$ linear-chain or branched-chain alkynyl group, and a substituted or unsubstituted $C_3$-$C_{12}$ cycloalkyl group, and when substituted, the substituent is halogen.

10. The electrochemical device according to claim 9, wherein the compound of Formula (I) or Formula (II) is at least one selected from the following compounds:

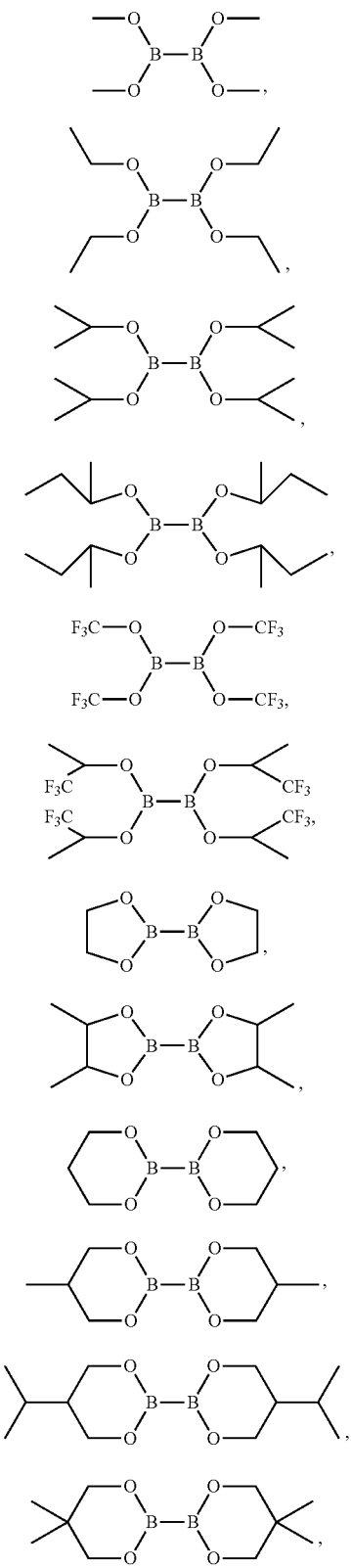

Formula (I-1)
Formula (I-2)
Formula (I-3)
Formula (I-4)
Formula (I-5)
Formula (I-6)
Formula (II-1)
Formula (II-2)
Formula (II-3)
Formula (II-4)
Formula (II-5)
Formula (II-6)

-continued

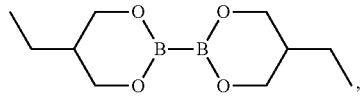

Formula (II-7)

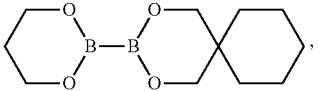

Formula (II-8)

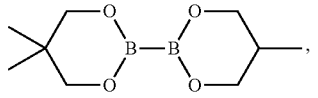

Formula (II-9)

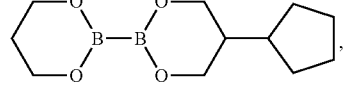

Formula (II-10)

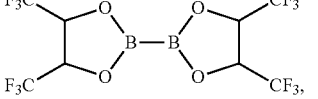

Formula (II-11)

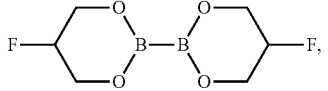

Formula (II-12)

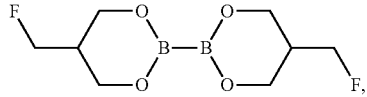

Formula (II-13)

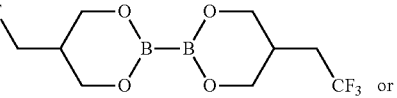

Formula (II-14)

or

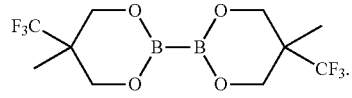

Formula (II-15)

11. The electrochemical device according to claim 9, wherein the electrolyte further comprises an epoxy silane, the epoxy silane comprising a compound of Formula (VIII):

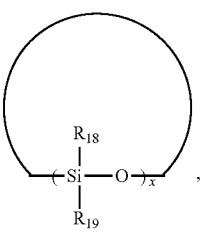

Formula (VIII)

wherein $R_{18}$ and $R_{19}$ are each independently selected from a substituted or unsubstituted $C_1$-$C_{12}$ alkyl group, a substituted or unsubstituted $C_2$-$C_{12}$ alkenyl group, a substituted or unsubstituted $C_2$-$C_{12}$ alkynyl group, and a substituted or unsubstituted $C_3$-$C_{12}$ cycloalkyl group, and when substituted, the substituent is halogen;

wherein $2 \leq x \leq 5$, and x is an integer.

12. The electrochemical device according to claim 9, wherein the electrolyte further comprises one or more of vinylene carbonate, fluoroethylene carbonate, 1,3-propane sultone, vinyl sulfate, lithium difluorophosphate, tris(trimethylsilyl) phosphate or trivinyl trimethylcyclotrisiloxane.

* * * * *